(12) United States Patent
Kim et al.

(10) Patent No.: US 12,181,357 B2
(45) Date of Patent: Dec. 31, 2024

(54) PRESSURE TRANSMITTER

(71) Applicant: KOREA ATOMIC ENERGY RESEARCH INSTITUTE, Daejeon (KR)

(72) Inventors: Hyungmo Kim, Daejeon (KR); Youngil Cho, Sejong-si (KR); Jewhan Lee, Daejeon (KR); Byeongyeon Kim, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 287 days.

(21) Appl. No.: 17/917,682

(22) PCT Filed: Apr. 6, 2021

(86) PCT No.: PCT/KR2021/004248
§ 371 (c)(1),
(2) Date: Oct. 7, 2022

(87) PCT Pub. No.: WO2021/210833
PCT Pub. Date: Oct. 21, 2021

(65) Prior Publication Data
US 2023/0152175 A1    May 18, 2023

(30) Foreign Application Priority Data
Apr. 16, 2020  (KR) .......................... 10-2020-0046064

(51) Int. Cl.
*G01L 19/04* (2006.01)
*G01L 13/02* (2006.01)
*G01L 19/00* (2006.01)

(52) U.S. Cl.
CPC ............ *G01L 19/04* (2013.01); *G01L 13/026* (2013.01); *G01L 19/0046* (2013.01)

(58) Field of Classification Search
CPC . G01L 13/026; G01L 13/0046; G01L 13/025; G01L 13/04; G01L 13/0645
See application file for complete search history.

(56) References Cited

U.S. PATENT DOCUMENTS 7,624,642 B2 * 12/2009 Romo ..................... G01L 19/04
                                                          73/717
9,140,620 B2 *  9/2015 Kuwana ................ G01L 13/026
(Continued)

FOREIGN PATENT DOCUMENTS

CN      106768590       5/2017
JP      H07260612       10/1995
(Continued)

*Primary Examiner* — Justin N Olamit
(74) *Attorney, Agent, or Firm* — LEX IP MEISTER, PLLC (57) ABSTRACT

A pressure transmitter is disclosed. A pressure measuring portion pressurized by a target fluid that is a target of a pressure measurement and a reference pressure measuring portion pressurized by an external fluid outside a pipe are provided. In addition, a part of the pressure measuring portion that is pressurized by the target fluid and a part of the reference pressure measuring portion that is pressurized by the external fluid are provided inside one thermally conductive member. Accordingly, at the portion pressurized by the target fluid and at the portion pressurized by the external fluid, a difference in temperature between the pressure measuring portion and the reference pressure measuring portion may be insignificantly small. As a result, an accuracy of an operation of correcting an error that may be generated by thermal expansion of the medium fluid in the pressure measuring portion can be improved.

19 Claims, 6 Drawing Sheets

(56) References Cited

U.S. PATENT DOCUMENTS 10,126,193 B2 * 11/2018 Sanden ............... G01L 19/0046
2009/0078054 A1 3/2009 Romo

FOREIGN PATENT DOCUMENTS

| | | |
|---|---|---|
| JP | 2002544514 | 12/2002 |
| JP | 2009510483 | 3/2009 |
| JP | 2013542429 | 11/2013 |
| JP | 2015078944 | 4/2015 |
| KR | 101040332 | 6/2011 |
| KR | 101200170 | 11/2012 |
| KR | 101996987 | 7/2019 |

* cited by examiner

PRESSURE TRANSMITTER

CROSS-REFERENCE TO RELATED APPLICATIONS

This application is the National Stage filing under 35 U.S.C. 371 of International Application No. PCT/KR2021/004248, filed on Apr. 6, 2021, which claims the benefit of earlier filing date of and rights of priority to Korean Application 10-2020-0046064 filed on Apr. 16, 2021, the contents of which are all hereby incorporated by reference herein in their entirety.

TECHNICAL FIELD

The present disclosure relates to a pressure transmitter, and more particularly, to a pressure transmitter having a structure capable of correcting a measurement error caused by thermal expansion of a heat transfer fluid.

BACKGROUND ART

Facilities such as nuclear power systems are operated in a range of several hundred degrees from 200° C. to 700° C., and in such facilities, substances in a liquid state in a wide range of temperature under normal pressure are used as a working fluid. For example, liquid sodium having a melting point of 98° C. and a boiling point of 890° C. may be used as a working fluid.

In order to recognize states of such systems, pressures such as differential pressure and static pressure of the working fluid need to be measured. However, as a sensor of a pressure gauge is not capable of withstanding high temperature of the working fluid, the pressure of the working fluid is measured by a pressure transmitter.

In addition, the pressure transmitter is configured to transmit the pressure of the working fluid to the pressure gauge through a separate medium fluid, in case the working fluid solidifies at room temperature.

The medium fluid of such a pressure transmitter is pressurized by the working fluid, and the pressure of the working fluid is sensed by a pressure sensor provided in the medium fluid.

Meanwhile, in order for facilities to operate stably, the pressure of the working fluid needs to be measured with a high level of precision. However, a temperature of the working fluid may change in a range of several hundred degrees, and a temperature of the medium fluid adjacent to the working fluid also changes in a range of several hundred degrees. When the temperature of the medium fluid changes in such a wide range, a volume of the medium fluid itself changes according to the change of the temperature.

A flexible member for transmitting pressure such as a diaphragm is provided between the medium fluid and the working fluid, and the flexible member may be elastically deformed to be curved as the medium fluid is thermally expanded by the change of the temperature.

However, a force to be restored to its original state is generated in the flexible member that is elastically deformed to be curved, and the medium fluid is pressurized by the flexible member as much as the generated restoring force.

In other words, since the restoring force is applied to the medium fluid in addition to the pressure of the working fluid, a measurement error is generated.

When a size of the flexible member is increased, the above-described measurement error can be reduced, but in this case, the size of the flexible member may be excessively increased.

Prior art document (U.S. Pat. No. 7,624,642 B2) discloses a differential pressure transmitter.

However, there is a limitation in that the prior art document does not disclose a solution for correcting an error that may be generated by an elastic force of the flexible member.

PRIOR ART DOCUMENT

Patent Document (Patent Document 1) Prior Art Document: U.S. Pat. No. 7,624,642 B2 (Dec. 1, 2009)

DISCLOSURE

Technical Problem

The present disclosure is directed to providing a pressure transmitter having a structure capable of solving the above problems.

First, an aspect of the present disclosure is to provide a pressure transmitter having a structure capable of correcting a measurement error caused by thermal expansion of a medium fluid.

Another aspect of the present disclosure is to provide a pressure transmitter having a structure capable of correcting a measurement error caused by thermal expansion of a medium fluid while not excessively increasing a size of a flexible member. In addition, an aspect of the present disclosure is to provide a pressure transmitter having a structure capable of correcting a measurement error caused by thermal expansion of a medium fluid even when a variable range of a temperature of a working fluid is large.

Technical Solution

In order to achieve the above aspects, a pressure transmitter according to an embodiment of the present disclosure includes a pressure measuring chamber filled with a medium fluid for pressure transmission and pressurized by a target fluid that is a target of a pressure measurement.

One side of the pressure measuring chamber is opened toward the target fluid, and the medium fluid in the pressure measuring chamber and the target fluid pressurize each other with a flexible member interposed therebetween.

The flexible member is made of a material having thermal conductivity and elasticity, and the medium fluid is thermally expanded by heat transferred from the target fluid.

In addition, the pressure transmitter is provided with a reference chamber.

The reference chamber is configured same as the pressure measuring chamber, but one side of the reference chamber is not opened toward the target fluid flowing through a pipe, but is opened toward an external fluid outside the pipe.

In addition, the reference chamber is configured to receive heat from the target fluid. Accordingly, the medium fluid in the reference chamber is thermally expanded by the heat transferred from the target fluid.

A degree in which a thermal energy is distributed in the medium fluid in the reference chamber and a degree in which a thermal energy is distributed in a medium fluid in the pressure measuring chamber are preferably similar to each other.

Specifically, a temperature of the medium fluid in the reference chamber and a temperature of the medium fluid in the pressure measuring chamber are preferably similar at a portion adjacent to a portion at which the flexible member is pressurized.

The pressure measuring chamber and the reference chamber are each provided with a pressure measuring sensor, and pressure values sensed by each of the pressure measuring sensors are transmitted to a controller so as to be used to derive a pressure of the target fluid.

A measurement error that may be generated by thermal expansion can be corrected by subtracting a pressure value measured in the reference chamber from a pressure value measured in the pressure measuring chamber.

In addition, a pressure transmitter according to an embodiment of the present disclosure includes: a first pressure measuring space with opened one side and filled with a pressure transmitting fluid therein; a first flexible member covering the opened one side of the first pressure measuring space; a second pressure measuring space with opened one side and filled with a pressure transmitting fluid therein; a second flexible member covering the opened one side of the second pressure measuring space; a first pressure sensor provided in the first pressure measuring space to measure a pressure of the pressure transmitting fluid in the first pressure measuring space; a second pressure sensor provided in the second pressure measuring space to measure a pressure of the pressure transmitting fluid in the second pressure measuring space; and a controller electrically connected to the first pressure sensor and the second pressure sensor, and configured to calculate a pressure of a target fluid that is a target of a pressure measurement by using a pressure value sensed by the first pressure sensor and a pressure value sensed by the second pressure sensor.

Further, the first flexible member is disposed to be pressurized by the target fluid, and the second flexible member is disposed to be pressurized by an external fluid.

In addition, the first flexible member is configured to be curved toward the target fluid as the pressure transmitting fluid in the first pressure measuring space is thermally expanded, and the second flexible member is configured to be curved toward the external fluid as the pressure transmitting fluid in the second pressure measuring space is thermally expanded.

In addition, the opened one side of the second pressure measuring space and the opened one side of the first pressure measuring space are in opposite directions. In addition, the opened one side of the first pressure measuring space and the opened one side of the second pressure measuring space are both provided in one member having thermal conductivity.

In addition, a pressure transmitter according to an embodiment of the present disclosure includes: a coupling portion inserted into a pipe through which a target fluid, which is a target of a pressure measurement, flows, and disposed to be partially contactable with the target fluid; a first pressure chamber connected to a portion other than the portion partially contactable with the target fluid in the coupling portion, extending in a direction away from the target fluid, and provided therein with a first measuring space in which one side thereof is opened toward the coupling portion; and a second pressure chamber connected to a portion other than the portion partially contactable with the target fluid in the coupling portion, extending in a direction away from the target fluid, and provided therein with a second measuring space in which one side thereof is opened toward the coupling portion.

In addition, the coupling portion is provided with a first connecting space, in which one end thereof is opened toward the target fluid and another end thereof communicates with the opened one side of the first measuring space, formed therethrough, and a second connecting space, in which one end thereof is opened toward an external fluid that flows outside the pipe and another end thereof communicates with the opened one side of the second measuring space, formed therethrough.

In addition, the opened one end of the first connecting space is covered by a first flexible member, and the opened one end of the second connecting space is covered by a second flexible member. The first measuring space and the second measuring space, and the first connecting space and the second connecting space are filled with pressure transmitting fluids.

In addition, the opened one end of the second connecting space and the opened one end of the first connecting space are in opposite directions.

In addition, the pressure transmitter includes: a first pressure sensor provided in the first measuring space to measure a pressure of the pressure transmitting fluid in the first measuring space; a second pressure sensor provided in the second measuring space to measure a pressure of the pressure transmitting fluid in the second measuring space; and a controller electrically connected to the first pressure sensor and the second pressure sensor, and configured to calculate a pressure of the target fluid by using a pressure value sensed by the first pressure sensor and a pressure value sensed by the second pressure sensor.

Advantageous Effects

According to an embodiment of the present disclosure, the following effects can be achieved.

First, a pressure measuring portion pressurized by a target fluid that is a target of a pressure measurement and a reference pressure measuring portion pressurized by an external fluid outside a pipe are provided.

In addition, a part of the pressure measuring portion that is pressurized by the target fluid and a part of the reference pressure measuring portion that is pressurized by the external fluid are provided inside one thermally conductive member.

Accordingly, at the portion pressurized by the target fluid and at the portion pressurized by the external fluid, a difference in temperature between the pressure measuring portion and the reference pressure measuring portion may be insignificantly small.

Therefore, a difference between a pressure in which a medium fluid in the pressure measuring portion pressurizes the flexible member by thermal expansion and a pressure in which a medium fluid in the reference pressure measuring portion pressurizes the flexible member by thermal expansion may be insignificantly small.

As a result, an accuracy of an operation of correcting an error that may be generated by thermal expansion of the medium fluid in the pressure measuring portion can be improved.

In addition, since the portion of the pressure measuring portion that is pressurized by the target fluid and the portion of the reference pressure measuring portion that is pressurized by the external fluid are both disposed close to the target fluid, a difference between a temperature at the pressure measuring portion and a temperature at the reference pressure measuring portion may be extremely small even when the temperature of the target fluid changes.

Therefore, even when the temperature of the target fluid changes, a degree of thermal expansion of the flexible member and the medium fluid in the pressure measuring portion and a degree of thermal expansion of the flexible member and the medium fluid in the reference pressure measuring portion are similar to each other.

Therefore, even when the temperature of the target fluid is changes, a pressure applied to the flexible member of the pressure measuring portion and a pressure applied to the flexible member of the reference pressure measuring portion are similar to each other.

As a result, even when the temperature of the target fluid changes, an error caused by thermal expansion can be accurately corrected corresponding to the change of the temperature.

BEST MODE

Hereinafter, description will be given in detail of a pressure transmitter in accordance with an embodiment disclosed herein, with reference to the accompanying drawings.

In the following description, description of several components will be omitted in order to clarify the technical features of the present disclosure.

1. Definition of Terms

The term "energization" used in the following description means that one component is electrically connected to another component or is connected to enable information communication. The energization may be implemented by conducting wires, communication cables, or the like.

The term "forward" used below refers to a direction toward a target fluid TF flowing through a pipe 1000.

The term "rearward" used below refers to a direction away from the target fluid TF flowing through the pipe 1000.

2. Description of a Pressure Transmitter 1 in Accordance with an Embodiment of the Present Disclosure Referring to FIG. 1, a pressure transmitter 1 according to an embodiment of the present disclosure is coupled to the pipe 1000 through which the target fluid TF flows to measure a pressure of the target fluid TF.

Figure 1:
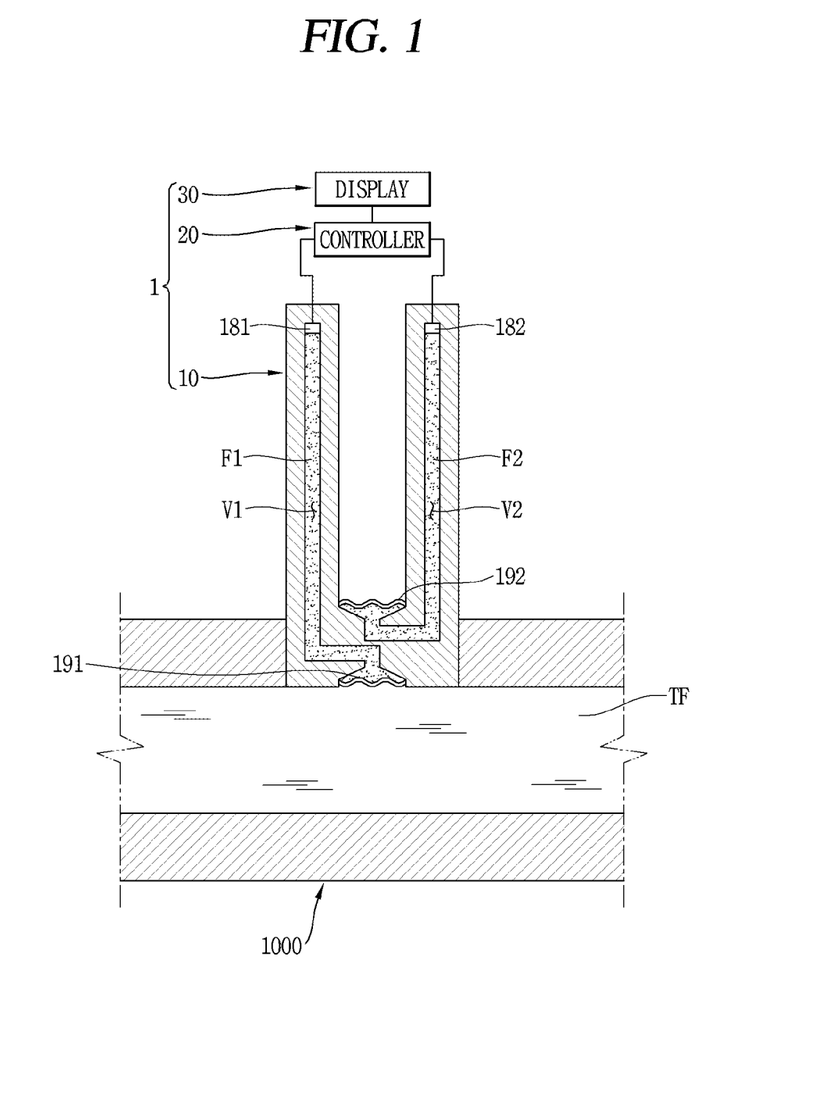
FIG. 1 is a conceptual view of a pressure transmitter according to an embodiment of the present disclosure.

In the illustrated embodiment, the target fluid TF flows in a hollow pipe 1000, but the embodiment is not limited thereto.

In an embodiment not illustrated, the target fluid TF may flow in various accommodating spaces that may be used in a nuclear power plant instead of the pipe 1000.

In addition, in an embodiment not illustrated, the pipe 1000 through which the target fluid TF flows may be formed such that one side thereof is closed. Accordingly, a dynamic pressure of the target fluid TF flowing through the pipe 1000 can be removed.

The pressure transmitter 1 includes a pressure measuring portion 10, a controller 20, and a display 30.

(1) Description of the Pressure Measuring Portion 10

The pressure measuring portion 10 is inserted into an opened portion of the pipe 1000. A part of the pressure measuring portion 10 inserted into the pipe 1000 is pressurized by the target fluid TF flowing through the pipe 1000.

The pressure measuring portion 10 includes a first pressure measuring space V1 filled with a first pressure transmitting fluid F1 and a second pressure measuring space V2 filled with a second pressure transmitting fluid F2.

In an embodiment, the first pressure transmitting fluid F1 and the second pressure transmitting fluid F2 may be metals capable of maintaining a liquid state within a variable temperature range of a system.

In an embodiment, the first pressure transmitting fluid F1 and the second pressure transmitting fluid F2 may be a molten metal of at least one selected from alkali metal containing sodium (Na), sodium-potassium (Na—K) alloy, lead-bismuth (Pb—Bi) alloy, and lead (Pb).

In an embodiment, for accuracy of error correction, the first pressure transmitting fluid F1 and the second pressure transmitting fluid F2 may be metals identical to each other. In addition, for accuracy of error correction, a volume of the first pressure transmitting fluid F1 and a volume of the second pressure transmitting fluid F2 may be same as each other.

One side of the first pressure measuring space V1 is opened toward an inner side of the pipe 1000 so as to be in contact with the target fluid TF. The first pressure measuring space V1 extends in a direction away from the target fluid TF.

The opened one side of the first pressure measuring space V1 is covered by a first flexible member 191. The first pressure measuring space V1 is sealed by the first flexible member 191.

The first flexible member 191 may be formed in a shape and a material that can be elastically deformed by being pressurized by the first pressure transmitting fluid F1 or the target fluid TF.

One side of the second pressure measuring space V2 is opened toward an outer side of the pipe 1000 so as to be in contact with a fluid outside the pipe 1000. The opened one side of the second pressure measuring space V2 and the opened one side of the first pressure measuring space V1 are in opposite directions.

In the illustrated embodiment, the second pressure measuring space V2 is opened toward the outer side of the pipe 1000, but the embodiment is not limited thereto.

In an embodiment not illustrated, the opened one side of the second pressure measuring space V2 may be formed in various positions that may be opened toward the fluid outside the pipe 1000.

The opened one side of the second pressure measuring space V2 is covered by a second flexible member 192. The second pressure measuring space V2 is sealed by the second flexible member 192.

The second flexible member 192 may be formed in a shape and a material that can be elastically deformed by being pressurized by the second pressure transmitting fluid F2 or the fluid outside the pipe 1000.

In an embodiment, the first flexible member 191 and the second flexible member 192 may be a flexible film such as a membrane and a diaphragm.

In an embodiment, the shape and material of the first flexible member 191 and the shape and material of the second flexible member 192 may be same as each other.

The first pressure measuring space V1 extends in a rear-to-front direction, and a front end portion of the first pressure measuring space V1 is opened toward the target fluid TF.

The second pressure measuring space V2 extends by a predetermined distance in the rear-to-front direction and then bent rearward. One end portion of the bent second pressure measuring space V2 is opened rearward.

In other words, the opened one end of the first pressure measuring space V1 and the opened one end of the second pressure measuring space V2 are in opposite directions.

In addition, the first flexible member 191 and the second flexible member 192 are disposed to overlap each other in a direction in which the pressure measuring portion 10 is inserted.

In addition, a value of a shortest distance between the first flexible member 191 and the second flexible member 192 may be equal to or smaller than a value of a thickness of the pipe 1000.

The target fluid TF pressurizes the first pressure transmitting fluid F1 through the first flexible member 191. In other words, the pressure of the target fluid TF may be transmitted to the first pressure transmitting fluid F1.

In addition, the first flexible member 191 is a thermally conductive member, whereby heat may be transferred from the target fluid TF to the first pressure transmitting fluid F1.

Accordingly, the first pressure transmitting fluid F1 is expanded by the heat, and the first flexible member 191 is elastically deformed by the expansion of the first pressure transmitting fluid F1 and is curved toward the target fluid TF.

Since the elastically deformed first flexible member 191 generates a restoring force to return to its original state, the first pressure transmitting fluid F1 is pressurized by the restoring force of the first flexible member 191.

In other words, the first pressure transmitting fluid F1 is pressurized by the target fluid TF and the first flexible member 191.

The second pressure transmitting fluid F2 is also expanded by the heat transferred from the target fluid TF.

Accordingly, the second flexible member 192 is elastically deformed by the expansion of the second pressure transmitting fluid F2 and is curved toward the fluid outside the pipe 1000.

Since the elastically deformed second flexible member 192 generates a restoring force to return to its original state, the second pressure transmitting fluid F2 is pressurized by the restoring force of the second flexible member 192.

In other words, the second pressure transmitting fluid F2 is pressurized by the second flexible member 192.

Since the restoring force due to thermal expansion is applied to the first pressure transmitting fluid F1 and the second pressure transmitting fluid F2, a measurement error due to the thermal expansion may be corrected by subtracting a pressure value measured in the second pressure transmitting fluid from a pressure value measured in the first pressure transmitting fluid.

However, for accurate error correction, it is preferable that the restoring force generated in the first flexible member 191 and the restoring force generated in the second flexible member 192 are the same.

However, when a degree of the thermal expansion of the first pressure transmitting fluid F1 at a portion where the first flexible member 191 is disposed and a degree of the thermal expansion of the second pressure transmitting fluid F2 at a portion where the second flexible member 192 is disposed are different, a magnitude of the restoring force generated by the elastic deformation of the first flexible member 191 and a magnitude of the restoring force generated by the elastic deformation of the second flexible member 192 may be different.

In addition, when the size and material of the first flexible member 191 and the size and material of the second flexible member 192 are different, the magnitude of the restoring force generated by the elastic deformation of the first flexible member 191 and the magnitude of the restoring force generated by the elastic deformation of the second flexible member 192 may be different.

Therefore, the size and material of the first flexible member 191 and the size and material of the second flexible member 192 are preferably same as each other.

In addition, both the first flexible member 191 and the second flexible member 192 are preferably disposed adjacent to the target fluid TF.

As described above, the value of the shortest distance between the first flexible member 191 and the second flexible member 192 may be equal to or smaller than a value of the thickness of the pipe 1000.

Accordingly, a difference between a temperature at a portion where the first flexible member 191 is disposed and a temperature at a portion where the second flexible member 192 is disposed may be insignificantly small.

The first pressure measuring space V1 is provided therein with a first pressure sensor 181, and the second pressure measuring space V2 is provided therein with a second pressure sensor 182.

The first pressure sensor 181 is configured to measure a pressure of the first pressure transmitting fluid F1. And, the second pressure sensor 182 is configured to measure a pressure of the second pressure transmitting fluid F2.

The first pressure sensor 181 senses information about a pressure of the target fluid TF and a pressure generated by the elastic deformation of the first flexible member 191, and the second pressure sensor 182 senses information about a pressure generated by the elastic deformation of the second flexible member 192.

The first pressure sensor 181 and the second pressure sensor 182 are each electrically connected to the controller 20. The information sensed by the first pressure sensor 181 and the information sensed by the second pressure sensor 182 are transmitted to the controller 20.

(2) Description of the Controller 20 and the Display 30

The controller 20 may be implemented in any form capable of inputting, outputting, and calculating information. In an embodiment, the controller 20 may be implemented in a form of a microprocessor, a central processing unit (CPU), a printed circuit board (PCB), or the like.

The controller 20 calculates information about the pressure of the target fluid TF in a predetermined method using each of the received information. The controller 20 may include a calculating portion that calculates information about the pressure.

In an embodiment, the predetermined method may be a method for subtracting a pressure value received by the second pressure sensor 182 from a pressure value received by the first pressure sensor 181.

However, the embodiment is not limited thereto, and a calculation for correcting an additional error that may be generated according to a design condition of the pressure transmitter 1 may be added.

Information about the pressure of the target fluid TF calculated by the controller 20 is transmitted to the display 30.

The display 30 converts the received information into information in a visual form and outputs the converted information.

In an embodiment, the display 30 may be an interface (not illustrated) having a display provided in the pressure transmitter 1. A user recognizes information about the pressure value of the target fluid TF through the information outputted on the display 30.

2. Description of the Pressure Measuring Portion 10 According to an Embodiment of the Present Disclosure FIGS. 2 to 5 illustrate the pressure measuring portion 10 according to an embodiment.

The pressure measuring portion 10 according to this embodiment measures the pressure of the target fluid TF through error correction as described above.

The pressure measuring portion 10 includes a coupling portion 110 inserted into a portion formed through the pipe 1000, a first pressure chamber 140 and a second pressure chamber 150 coupled to the coupling portion 110, a hollow main body 160 surrounding the first pressure chamber 140 and the second pressure chamber 150, and a rear body 170 coupled to the hollow main body 160.

(1) Description of the Coupling Portion 110 and the Flexible Members 191 and 192

Figure 4:
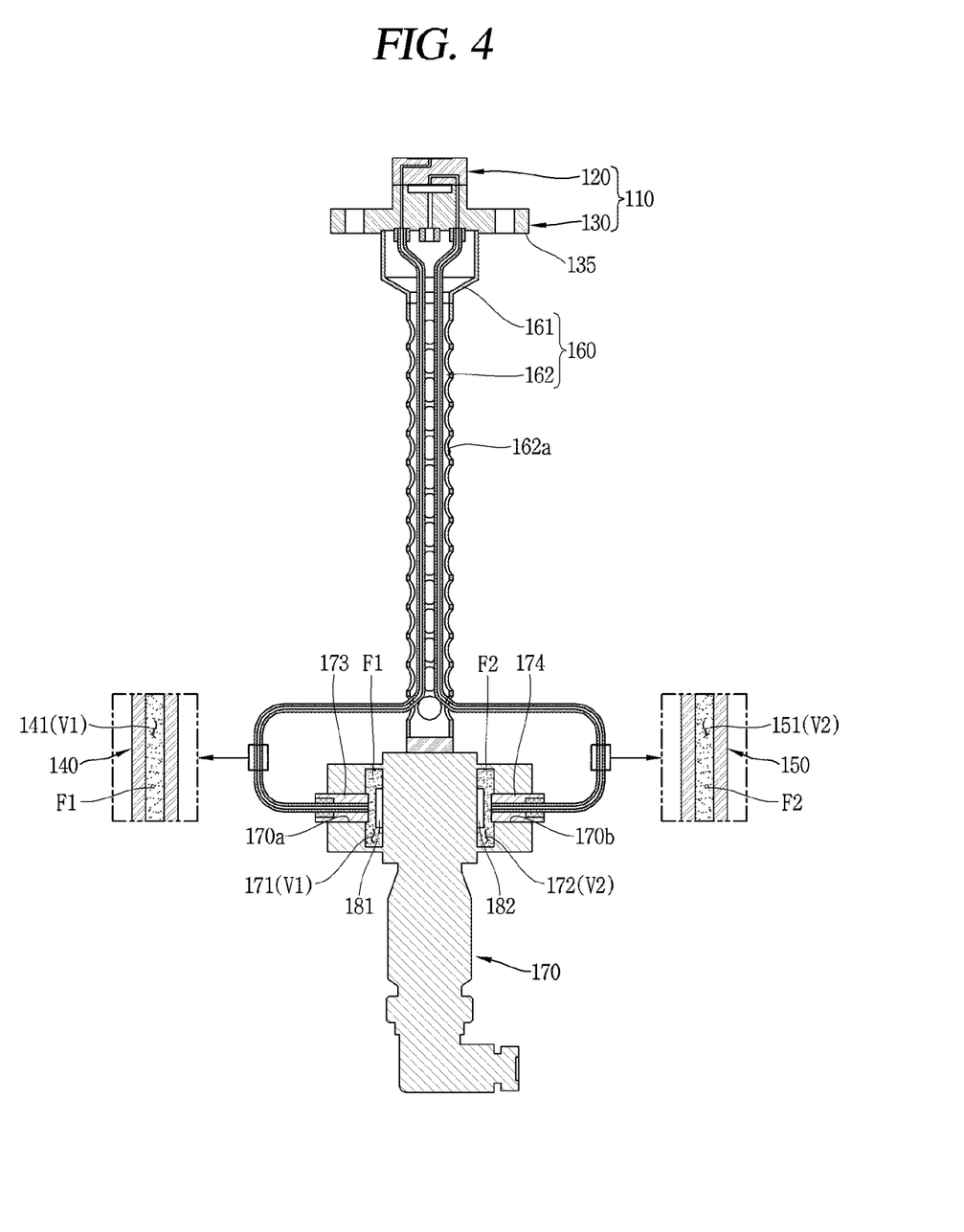
FIG. 4 is a cross-sectional view illustrating the pressure measuring portion according to FIG. 3 taken along line IV-IV.

The coupling portion 110 is partially inserted into the pipe 1000 through which the target fluid TF flows, and a part of the coupling portion 110 is brought into contact with the target fluid TF. A front surface of the coupling portion 110 is brought into contact with the target fluid TF.

The coupling portion 110 includes a first connecting space filled with the first pressure transmitting fluid F1 and a second connecting space filled with the second pressure transmitting fluid F2.

The first connecting space includes a first curved passage 121 and a first straight passage 131 to be described later, and the second connecting space includes a second curved passage 122 and a second straight passage 132 to be described later.

The coupling portion 110 includes a first coupling portion 120 and a second coupling portion 130 that are sequentially arranged in a direction away from the target fluid TF.

The first coupling portion 120 is entirely inserted into the pipe 1000, and the second coupling portion 130 is partially inserted into the pipe 1000.

The first curved passage 121 and the second curved passage 122 are formed in the first coupling portion 120.

One end of the first curved passage 121 is disposed at a front surface of the first coupling portion 120 and another end of the first curved passage 121 is disposed at a rear surface of the first coupling portion 120. The first curved passage 121 is formed such that the opened one end and the opened another end communicate with each other. In an embodiment, the one end of the first curved passage 121 may be disposed at a central portion of the front surface, and the another end of the first curved passage 121 may be disposed adjacent to a circumference of the rear surface.

A first groove 123 is formed to be recessed at a portion where the one end of the first curved passage 121 is disposed. In other words, the one end of the first curved passage 121 is disposed at a central portion of the first groove 123.

The first flexible member 191 is coupled to the first groove 123 to cover the opened one end of the first curved passage 121. The first flexible member 191 has been described above, and will not be repeated.

A circumference of a rear surface of the first flexible member 191 is coupled to the first groove 123. Accordingly, an inner portion of a circumference of the first flexible member 191 may be elastically deformed to be spaced apart from the first groove 123.

One end and another end of the second curved passage 122 are both disposed at the rear surface of the first coupling portion 120. The second curved passage 122 is formed such that the opened one end and the opened another end communicate with each other. In other words, the second curved passage 122 extends in the rear-to-front direction by a predetermined distance from the rear surface of the first coupling portion 120, and then is bent to extend rearward.

In an embodiment, the one end of the second curved passage 122 may be disposed at a central portion of the rear surface of the first coupling portion 120, and the another end of the second curved passage 122 may be disposed adjacent to the circumference of the rear surface.

In an embodiment, the one end of the second curved passage 122 may be disposed between the another end of the second curved passage 122 and the another end of the first curved passage 121.

A second groove 124 is formed to be recessed at a portion where the one end of the second curved passage 122 is disposed. In other words, the one end of the second curved passage 122 is disposed at a central portion of the second groove 124.

The second flexible member 192 is coupled to the second groove 124 to cover the opened one end of the second curved passage 122. The second flexible member 192 has been described above, and will not be repeated.

A circumference of a front surface of the second flexible member 192 is coupled to the second groove 124. Accordingly, an inner portion of a circumference of the second flexible member 192 may be elastically deformed to be spaced apart from the second groove 124.

In an embodiment, the coupling portion 120 may be defined in a cylindrical shape.

The second coupling portion 130 is coupled to the rear surface of the first coupling portion 120.

The second coupling portion 130 is provided with the first straight passage 131, the second straight passage 132, and an external fluid inflow passage 134 formed therethrough in a front-to-rear direction.

Opposite ends of the first straight passage 131 are opened to communicate with each other and opposite ends of the second straight passage 132 are opened to communicate with each other. One end of the first straight passage 131 is disposed at a front surface of the second coupling portion 130 and another end of the first straight passage 131 is disposed at a rear surface of the second coupling portion 130. And, one end of the second straight passage 132 is disposed at the front surface of the second coupling portion 130 and another end of the second straight passage 132 is disposed at the rear surface of the second coupling portion 130.

The one end of the first straight passage 131 is disposed at a position communicating with the another end of the first curved passage 121 when the first coupling portion 120 and the second coupling portion 130 are coupled. Accordingly, the first curved passage 121 and the first straight passage 131 communicate with each other.

The one end of the second straight passage 132 is disposed at a position communicating with the another end of the second curved passage 122 when the first coupling portion 120 and the second coupling portion 130 are coupled. Accordingly, the second curved passage 122 and the second straight passage 132 communicate with each other.

Opposite ends of the external fluid inflow passage 134 are opened to communicate with each other, wherein one end of the external fluid inflow passage 134 is disposed at the front surface of the second coupling portion 130 and another end of the external fluid inflow passage 134 is disposed at the rear surface of the second coupling portion 130.

In addition, an external fluid inflow groove 133 is formed to be recessed at a portion where the one end of the external fluid inflow passage 134 is disposed.

Figure 5:
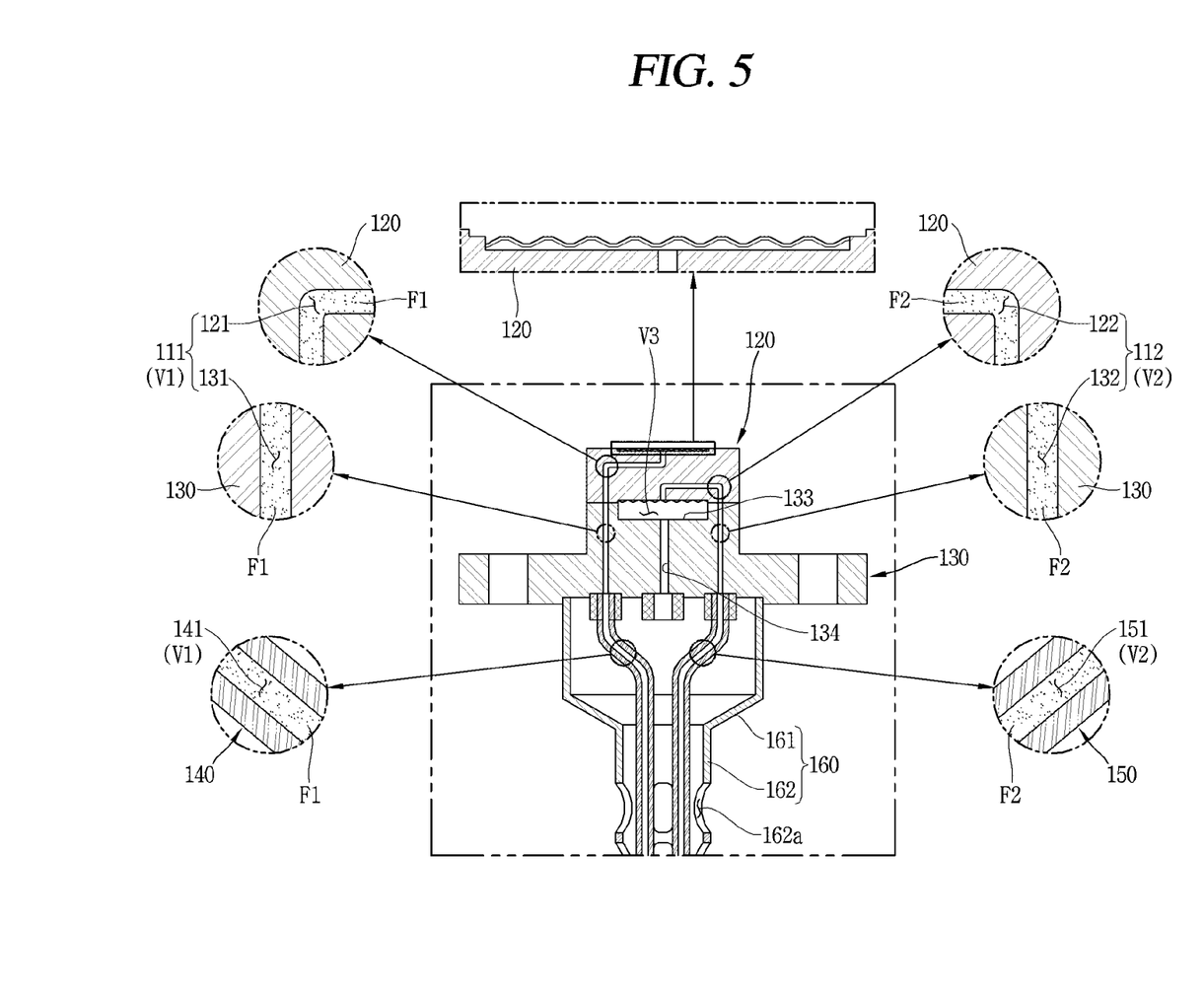
FIG. 5 is an enlarged partial cross-sectional view illustrating an area A of FIG. 4.

The external fluid inflow groove 133 is covered by a part of the first coupling portion 120 where the second flexible member 192 is installed. An external fluid inflow space V3 is formed between the external fluid inflow groove 133 and the rear surface of the first coupling portion 120.

The external fluid inflow space V3 is communicated with the outside of the pipe 1000 through the external fluid inflow passage 134, and the fluid outside the pipe 1000 is introduced into the external fluid inflow space V3 through the external fluid inflow passage 134. The external fluid pressurizes the second flexible member 192 with a predetermined pressure. The predetermined pressure may be atmospheric pressure.

The second flexible member 192 is disposed to overlap the external fluid inflow space V3 in a direction away from the target fluid TF. Accordingly, an entire rear surface of the second flexible member 192 may be pressurized by the external fluid.

The second flexible member 192 is disposed between the first coupling portion 120 and the second coupling portion 130. In other words, the second flexible member 192 is disposed to be spaced apart in a forward direction by a predetermined distance from the rear surface of the second coupling portion 130.

Accordingly, the second flexible member 192 can be disposed closer to the target fluid TF. In other words, a distance between the second flexible member 192 and the first flexible member 191 is reduced.

In an embodiment, a value of a distance between the first flexible member 191 and the second flexible member 192 may be smaller than the value of the thickness of the pipe 1000.

As the distance between the first flexible member 191 and the second flexible member 192 is small, a difference between a temperature at a portion where the first flexible member 191 is disposed and a temperature at a portion where the second flexible member 192 is disposed may be reduced.

Specifically, as the value of the distance between the first flexible member 191 and the second flexible member 192 is smaller than the value of the thickness of the pipe 1000, the difference between the temperature at the portion where the first flexible member 191 is disposed and the temperature at the portion where the second flexible member 192 is disposed may be insignificantly small.

As a result, the restoring force generated in the first flexible member 191 and the restoring force generated in the second flexible member 192 due to thermal expansion may be similar to each other. In other words, the accuracy in correcting errors caused by thermal expansion may be improved.

When the target fluid TF is constantly provided, errors can be corrected by continuously correcting a specified error value. However, when the temperature of the target fluid TF continuously changes, an error value to be corrected is changed, and this may cause a problem in applying a method for continuously correcting a specific value.

However, in the pressure measuring portion 10 according to this embodiment, even when the temperature of the target fluid TF changes, the temperatures at the portions where the first flexible member 191 and the second flexible member 192 are disposed also change similarly thereto. Accordingly, even when the temperature of the target fluid TF changes, an error caused by thermal expansion can be accurately corrected.

The second coupling portion 130 has a cylindrical shape, and an outer circumferential surface of the second coupling portion 130 has a flange portion 135 protruding therefrom in a circumferential direction.

A fastening member (not illustrated) passes through the flange portion 135 to be inserted into the pipe 1000, and the coupling portion 110 is coupled to the pipe 1000 by a fastening force between the fastening member and the pipe 1000.

The first pressure chamber 140 and the second pressure chamber 150 are coupled to the rear surface of the second coupling portion 130.

(2) Description of the First Pressure Chamber 140 and the Second Pressure Chamber 150

A first measuring space 141 opened forward is formed in the first pressure chamber 140, and a second measuring space 151 opened forward is formed in the second pressure chamber 150.

The first measuring space 141 communicates with the first connecting space 121 and 131 to form the first pressure measuring space V1, and the second measuring space 151 communicates with the second connecting space 122 and 132 to form the second pressure measuring space V2.

The first pressure transmitting fluid F1 is filled in the first pressure measuring space V1, and the second pressure transmitting fluid F2 is filled in the second pressure measuring space V2.

The first pressure chamber 140 and the second pressure chamber 150 each may be formed in a hollow shape extending in the front-to-rear direction.

Specifically, an opened front end of the first pressure chamber 140 is coupled to the another end of the first straight passage 131 disposed at the rear surface of the second coupling portion 130. A sealing structure may be provided at a portion where the front end of the first pressure chamber 140 and the another end of the first straight passage 131 are coupled to prevent a leakage of the first pressure transmitting fluid F1.

An opened front end of the second pressure chamber 150 is coupled to the another end of the second straight passage 132 disposed at the rear surface of the second coupling portion 130. A sealing structure may be provided at a portion where the front end of the second pressure chamber 150 and the another end of the second straight passage 132 are coupled to prevent a leakage of the second pressure transmitting fluid F2.

The first pressure chamber 140 and the second pressure chamber 150 are surrounded by the hollow main body 160.

(3) Description of the Hollow Main Body 160

The hollow main body 160 protects the first pressure chamber 140 and the second pressure chamber 150 from external impacts and dissipates heat from the first pressure chamber 140 and the second pressure chamber 150.

The hollow main body 160 is formed in a hollow shape extending in the front-to-rear direction, and provided with a connecting portion 161 coupled to the rear surface of the second coupling portion 130, and a heat dissipating portion 162 coupled to a rear end of the connecting portion 161.

The connecting portion 161 is defined in a cylindrical shape with a rear edge thereof is chamfered, and has a hollow shape with opposite ends thereof are opened. However, the shape is not limited thereto, and may be formed in various shapes.

Figure 2:
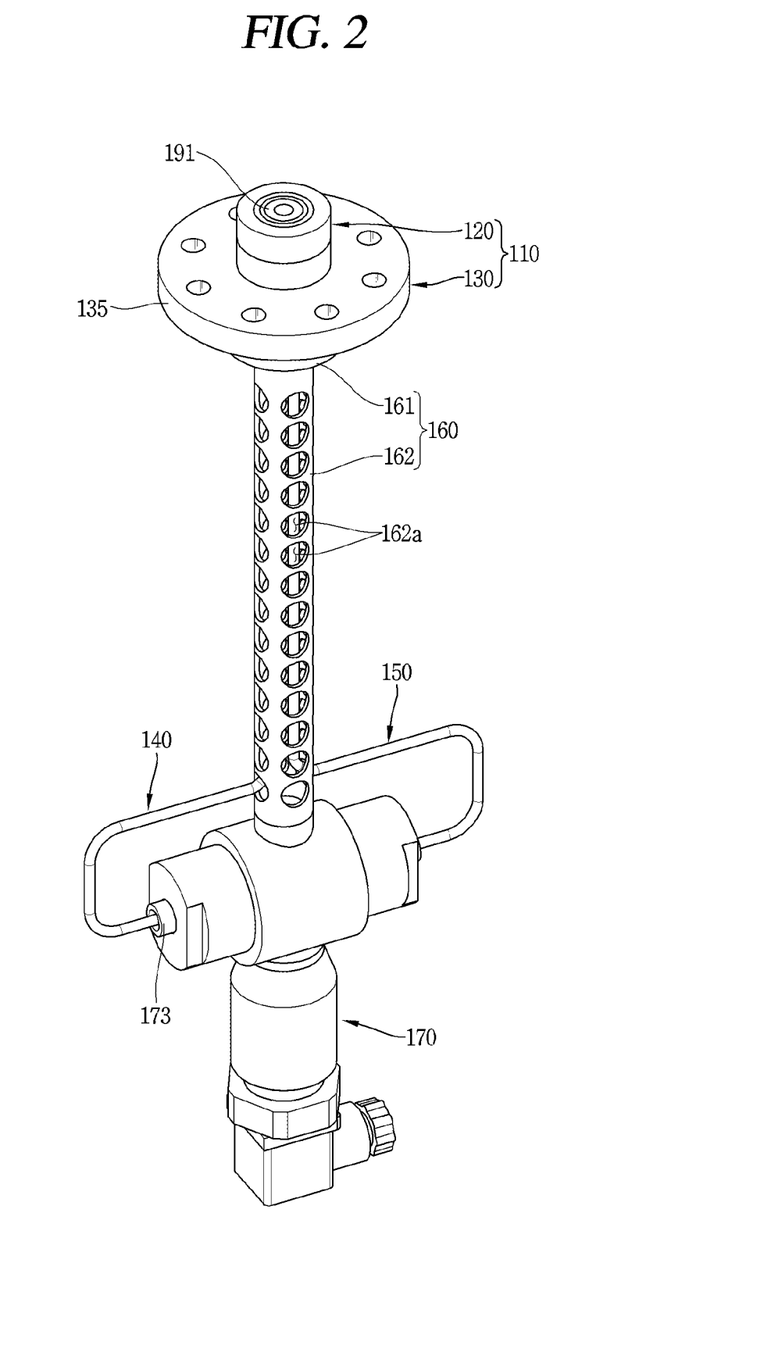
FIG. 2 is a perspective view of a pressure measuring portion according to an embodiment of the present disclosure.
Figure 3:
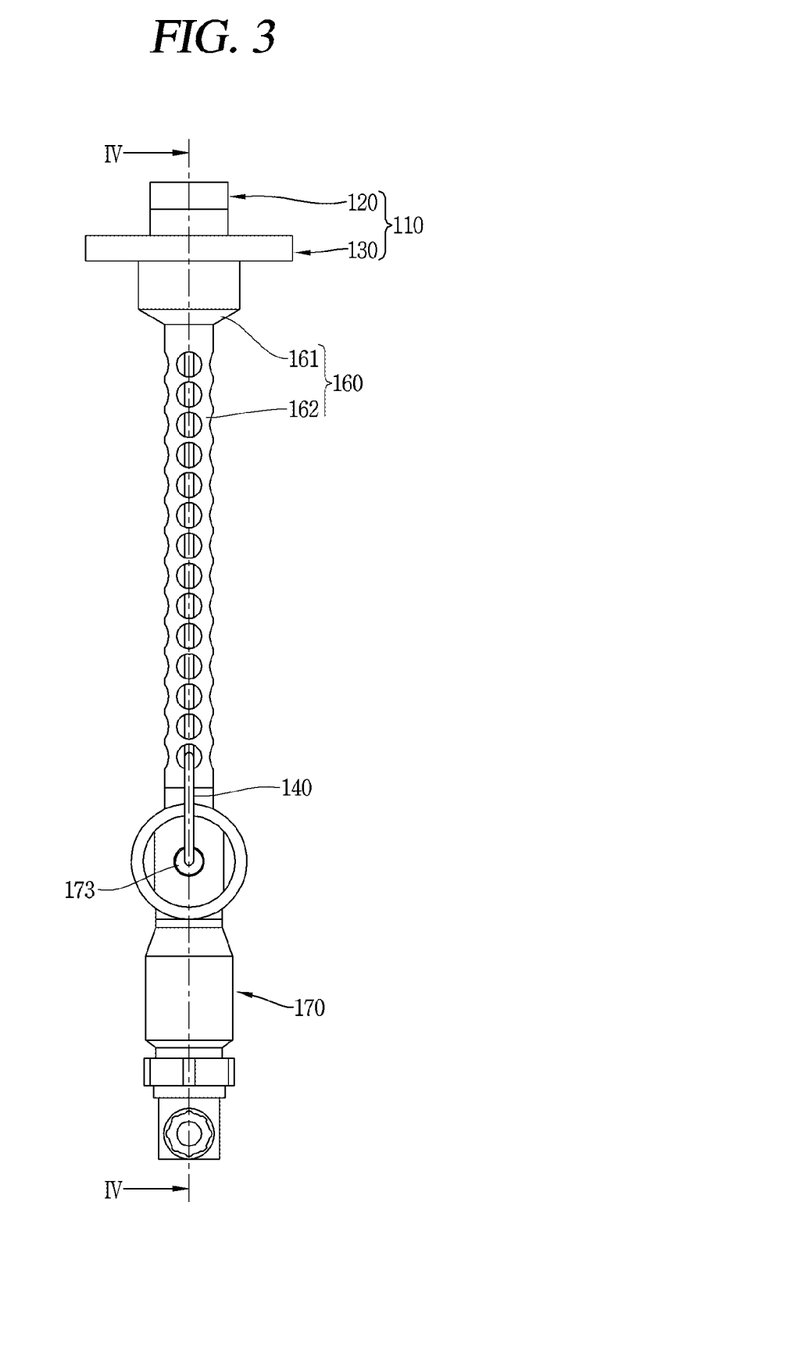
FIG. 3 is a planar view of the pressure measuring portion according to FIG. 2.

The heat dissipating portion 162 is defined in a hollow cylindrical shape extending in the front-to-rear direction. A plurality of heat dissipating holes 162a are formed through an outer circumferential surface of the heat dissipating portion 162. As the heat dissipating holes 162a are formed, heat discharged from the first pressure chamber 140 and the second pressure chamber 150 can be smoothly dissipated outwardly of the heat dissipating portion 162.

The rear body 170 is coupled to a rear end of the heat dissipating portion 162.

(4) Description of the Rear Body 170

The rear body 170 may be provided to improve a reliability of the pressure transmitter 1.

For accuracy of measurement, the first pressure chamber 140 and the second pressure chamber 150 are each defined in a tube shape having a small diameter. In this case, there exists a danger in which the first pressure chamber 140 and the second pressure chamber 150 are damaged by an external impact. In addition, since inner areas of the first pressure chamber 140 and the second pressure chamber 150 are small, cost of directly inserting the pressure sensors 181 and 182, to be described later, into the first pressure chamber 140 and the second pressure chamber 150 may be increased.

With this reason, a first pressure sensor accommodating space 171 and a second pressure sensor accommodating space 172 are formed in the separate rear body 170 and are each connected to the first pressure chamber 140 and the second pressure chamber 150.

The first pressure sensor accommodating space 171 and the second pressure sensor accommodating space 172 are formed at opposite sides of the rear body 170 in a direction intersecting the front-rear direction.

In addition, a first coupling hole 170a is formed through from an outer surface of the rear body 170 to the first pressure sensor accommodating space 171, and a second coupling hole 170b is formed through from the outer surface of the rear body 170 to the second pressure sensor accommodating space 172.

A rear side of the first pressure chamber 140 and a rear side of the second pressure chamber 150 exit outwardly of the hollow main body 160 through the heat dissipating holes 162a, and then are bent to be inserted in the first coupling hole 170a and the second coupling hole 170b, respectively.

A first coupling member 173 having a structure capable of being screwed to the first coupling hole 170a is coupled to a rear end of the first pressure chamber 140. As the first coupling member 173 is coupled to the first coupling hole 170a, the first measuring space 141 of the first pressure chamber 140 communicates with the first pressure sensor accommodating space 171. The first pressure sensor accommodating space 171 is provided therein with the first pressure sensor 181.

The first connecting space 111, the first measuring space 141, and the first pressure sensor accommodating space 171 communicate among others to form the first pressure measuring space V1.

The pressure of the target fluid TF applied to the first flexible member 191 provided in the first connecting space 111 and the pressure due to the elastic deformation of the first flexible member 191 are applied to the first pressure transmitting fluid F1.

The first pressure sensor 181 disposed in the first pressure sensor accommodating space 171 is pressurized by the first pressure transmitting fluid F1 to measure the pressure of the target fluid TF applied to the first flexible member 191 and the pressure applied by the elastic deformation of the first flexible member 191.

A second coupling member 174 having a structure capable of being screwed to the second coupling hole 170b is coupled to a rear end of the second pressure chamber 150. As the second coupling member 174 is coupled to the second coupling hole 170b, the second measuring space 151 of the second pressure chamber 150 communicates with the second pressure sensor accommodating space 172. The second pressure sensor accommodating space 172 is provided therein with the second pressure sensor 182.

The second connecting space 112, the second measuring space 151, and the second pressure sensor accommodating space 172 communicate among others to form the second pressure measuring space V2.

The second pressure transmitting fluid F2 is pressurized by the elastic deformation of the second flexible member 192.

The second pressure sensor 182 disposed in the second pressure sensor accommodating space 172 is pressurized by the second pressure transmitting fluid F2 to measure the pressure applied by the elastic deformation of the second flexible member 192.

The first pressure sensor 181 and the second pressure sensor 182 are each preferably disposed at a rear side of the first pressure measuring space V1 and a rear side of the second pressure measuring space V2 in a direction away from the target fluid TF.

When the first pressure sensor 181 and the second pressure sensor 182 are disposed to be close to the target fluid TF, the first pressure sensor 181 and the second pressure sensor 182 may be damaged by excessive heat.

Damage on the first pressure sensor 181 and the second pressure sensor 182 due to excessive heat can be suppressed by disposing the first pressure sensor 181 and the second pressure sensor 182 in the rear body 170 and separating them from the target fluid TF.

The first pressure sensor 181 and the second pressure sensor 182 are electrically connected to the controller 20 (see FIG. 1) disposed outside the rear body 170.

The controller 20 calculates information about the pressure of the target fluid TF in a predetermined method by using information detected by the first pressure sensor 181 and the second pressure sensor 182.

A method for calculating pressure information about the target fluid TF by the controller 20 has been described above, and will not be repeated.

The pressure information about the target fluid TF calculated by the controller 20 is converted into a visual form so as to be outputted on the display 30.

3. Description of an Effect of a Measurement Structure According to an Embodiment of the Present Disclosure Referring to FIG. 6, the first flexible member 191 is elastically deformed to be curved due to thermal expansion of the first pressure transmitting fluid F1, and the second flexible member 192 is elastically deformed to be curved due to thermal expansion of the second pressure transmitting fluid F2.

Figure 6:
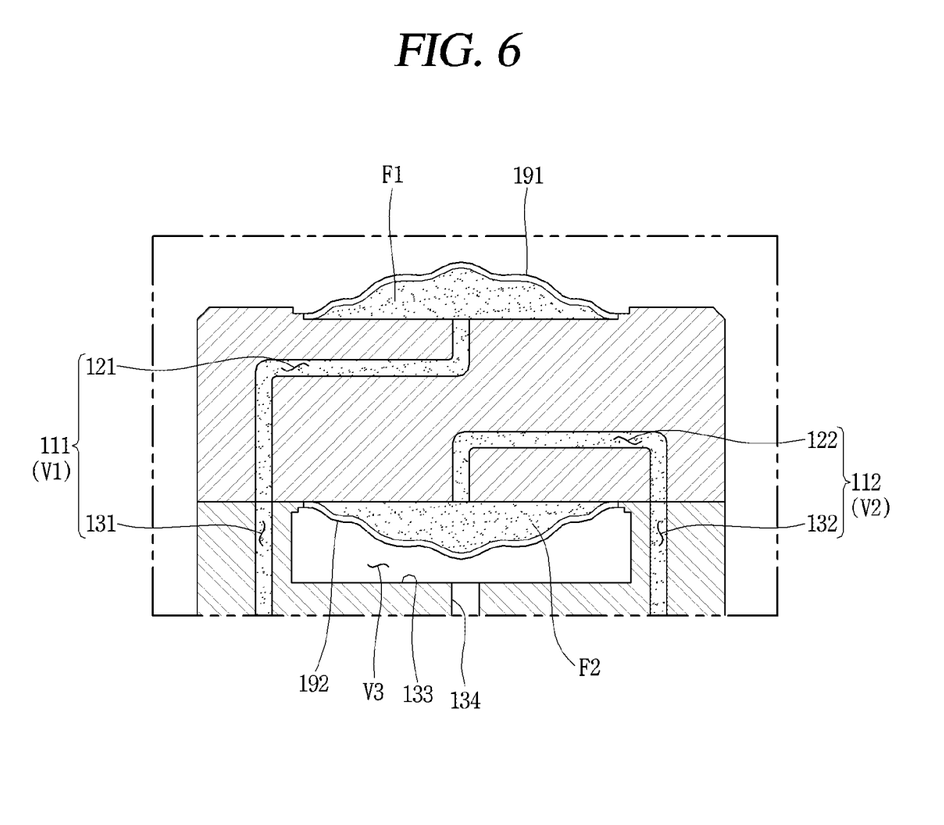
FIG. 6 is a conceptual view illustrating a process of a flexible member being curved in a coupling portion according to FIG. 4.

Since a force of the elastically deformed first flexible member 191 to be restored to its original state is applied to the first pressure transmitting fluid F1, an error may be generated when measuring the pressure of the target fluid TF.

The error may be corrected by measuring the force of the elastically deformed second flexible member 192 to be restored to its original state, and then subtracting the measured force value from a pressure value measured by the first pressure sensor 181. For accuracy of correction, it is preferable that a difference between the restoring force of the first flexible member 191 and the restoring force of the second flexible member 192 is as small as possible.

The structure of the pressure transmitter 1 according to this embodiment has an effect of forming as small as possible the difference between the restoring force of the first flexible member 191 and the restoring force of the second flexible member 192.

Specifically, the effect is as follows.

First, the first pressure measuring space V1 pressurized by the target fluid TF that is a target of a pressure measurement and the second pressure measuring space V2 pressurized by the fluid outside the pipe 1000 are provided.

In addition, a portion of the first pressure measuring space V1 that is pressurized by the target fluid TF and a portion of the second pressure measuring space V2 that is pressurized by the external fluid are both formed inside the first coupling portion 120.

Accordingly, at the portion pressurized by the target fluid TF and at the portion pressurized by the external fluid, a difference in temperature between the first pressure measuring space V1 and the second pressure measuring space V2 may be insignificantly small.

Therefore, a difference between a pressure in which the first pressure transmitting fluid F1 of the first pressure measuring space V1 pressurizes the first flexible member 191 by thermal expansion and a pressure in which the second pressure transmitting fluid F2 of the second pressure measuring space V2 pressurizes the second flexible member 192 by thermal expansion may be insignificantly small.

As a result, an accuracy of an operation of correcting an error that may be generated by thermal expansion of the first pressure transmitting fluid F1 in the first pressure measuring space V1 can be improved.

In addition, since a portion of the first pressure measuring space V1 that is pressurized by the target fluid TF and a portion of the second pressure measuring space V2 that is pressurized by the external fluid are both disposed close to the target fluid TF, a difference between a temperature at the first pressure measuring space V1 and a temperature at the second pressure measuring space V2 may be extremely small even when the temperature of the target fluid TF changes.

Therefore, even when the temperature of the target fluid TF changes, a degree of thermal expansion of the first flexible member 191 and the first pressure transmitting fluid F1 in the first pressure measuring space V1 and a degree of thermal expansion of the second flexible member 192 and the second pressure transmitting fluid F2 in the second pressure measuring space V2 are similar to each other.

Therefore, even when the temperature of the target fluid TF changes, a pressure applied to the first flexible member 191 of the first pressure measuring space V1 and a pressure applied to the second flexible member 192 of the second pressure measuring space V2 are similar to each other.

As a result, even when the temperature of the target fluid TF changes, an error caused by thermal expansion can be accurately corrected corresponding to the change of the temperature.

Although the foregoing description has been given with reference to the preferred embodiment, it will be understood that those skilled in the art will be able to variously modify and change the present disclosure without departing from the scope of the disclosure described in the claims below.

The invention claimed is:

1. A pressure transmitter, comprising:
   a first pressure measuring space with opened one side and filled with a pressure transmitting fluid therein;
   a first flexible member covering the opened one side of the first pressure measuring space;
   a second pressure measuring space with opened one side and filled with a pressure transmitting fluid therein;
   a second flexible member covering the opened one side of the second pressure measuring space;
   a first pressure sensor provided in the first pressure measuring space to measure a pressure of the pressure transmitting fluid in the first pressure measuring space;
   a second pressure sensor provided in the second pressure measuring space to measure a pressure of the pressure transmitting fluid in the second pressure measuring space; and
   a controller electrically connected to the first pressure sensor and the second pressure sensor, and configured to calculate a pressure of a target fluid that is a target of a pressure measurement by using a pressure value sensed by the first pressure sensor and a pressure value sensed by the second pressure sensor,
   wherein the first flexible member is disposed to be pressurized by the target fluid, and the second flexible member is disposed to be pressurized by an external fluid.

2. The pressure transmitter of claim 1, wherein the first flexible member is configured to be curved toward the target fluid as the pressure transmitting fluid in the first pressure measuring space is thermally expanded, and
   the second flexible member is configured to be curved toward the external fluid as the pressure transmitting fluid in the second pressure measuring space is thermally expanded.

3. The pressure transmitter of claim 2, wherein the first flexible member and the second flexible member are made of thermally conductive materials identical to each other.

4. The pressure transmitter of claim 3, wherein the first flexible member and the second flexible member are defined in shapes identical to each other.

5. The pressure transmitter of claim 1, wherein the opened one side of the second pressure measuring space and the opened one side of the first pressure measuring space are in opposite directions.

6. The pressure transmitter of claim 1, wherein the opened one side of the first pressure measuring space and the opened one side of the second pressure measuring space are both provided in one member having thermal conductivity.

7. The pressure transmitter of claim 1, wherein the first pressure measuring space is inserted into a pipe, through which the target fluid flows, by a predetermined depth, and
wherein a shortest distance between the first flexible member and the second flexible member is equal to or smaller than the predetermined depth.

8. A pressure transmitter, comprising:
a coupling portion configured to be inserted into a pipe through which a target fluid, which is a target of a pressure measurement, flows, and disposed to be partially contactable with the target fluid;
a first pressure chamber connected to the coupling portion, extending in a direction away from the target fluid, and provided therein with a first measuring space in which one side thereof is opened toward the coupling portion;
a second pressure chamber connected to the coupling portion, extending in a direction away from the target fluid, and provided therein with a second measuring space in which one side thereof is opened toward the coupling portion;
a first flexible member;
a second flexible member; and
pressure transmitting fluids;
wherein the coupling portion is provided with:
a first connecting space, in which one end thereof is opened toward the target fluid and another end thereof communicates with the opened one side of the first measuring space, formed therethrough, and
a second connecting space, in which one end thereof is opened toward an external fluid that flows outside the pipe and another end thereof communicates with the opened one side of the second measuring space, formed therethrough, and
wherein the opened one end of the first connecting space is covered by the first flexible member, and the opened one end of the second connecting space is covered by the second flexible member, and
wherein the first measuring space and the second measuring space, and the first connecting space and the second connecting space are filled with the pressure transmitting fluids.

9. The pressure transmitter of claim 8, wherein the opened one end of the second connecting space and the opened one end of the first connecting space are in opposite directions.

10. The pressure transmitter of claim 9, wherein, between one surface facing the target fluid and another surface facing the external fluid in the coupling portion, there are provided:
an external fluid inflow space having a predetermined volume; and
an external fluid inflow passage forming a path through which the external fluid is introduced into the external fluid inflow space by communicating between the external fluid inflow space and the another surface, and
wherein the opened one end of the second connecting space communicates with the external fluid inflow space.

11. The pressure transmitter of claim 10, wherein the second flexible member overlaps the external fluid inflow space in a direction away from the target fluid.

12. The pressure transmitter of claim 10, wherein the coupling portion comprises a first coupling portion and a second coupling portion sequentially arranged in a direction away from the target fluid and coupled to each other, and
wherein the external fluid inflow space is formed between an external fluid inflow groove recessed at one surface of the second coupling portion facing the target fluid and one surface of the first coupling portion facing the second coupling portion.

13. The pressure transmitter of claim 12, wherein an outer circumferential surface of the second coupling portion is provided with a flange portion protruding therefrom,
wherein the flange portion has a fastening member passing through the flange portion to be inserted into the pipe, and
wherein the coupling portion is coupled to the pipe by a fastening force of the fastening member.

14. The pressure transmitter of claim 8, further comprising:
a first pressure sensor provided in the first measuring space to measure a pressure of the pressure transmitting fluid in the first measuring space;
a second pressure sensor provided in the second measuring space to measure a pressure of the pressure transmitting fluid in the second measuring space; and
a controller electrically connected to the first pressure sensor and the second pressure sensor, and configured to calculate a pressure of the target fluid by using a pressure value sensed by the first pressure sensor and a pressure value sensed by the second pressure sensor.

15. The pressure transmitter of claim 14, wherein the first pressure sensor is disposed at another side of the first measuring space in a direction away from the target fluid, and
the second pressure sensor is disposed at another side of the second measuring space in a direction away from the target fluid.

16. The pressure transmitter of claim 8, wherein the first flexible member is configured to be curved toward the target fluid as the pressure transmitting fluid in the first connecting space is thermally expanded, and
the second flexible member is configured to be curved toward the external fluid as the pressure transmitting fluid in the second connecting space is thermally expanded.

17. The pressure transmitter of claim 16, wherein the first flexible member and the second flexible member are made of thermally conductive materials identical to each other, and
the first flexible member and the second flexible member are defined in shapes identical to each other.

18. The pressure transmitter of claim 8, further comprising:
a hollow main body connected to the coupling portion, surrounding the first pressure chamber and the second pressure chamber, and extending in a direction away from the target fluid,
wherein an outer circumferential surface of the hollow main body is provided with a plurality of heat dissipating holes.

19. The pressure transmitter of claim 8, wherein the coupling portion is inserted into a portion formed through the pipe, and
a value of a shortest distance between the first flexible member and the second flexible member is equal to or smaller than a value of a depth of the pipe.

* * * * *